Figure 1:
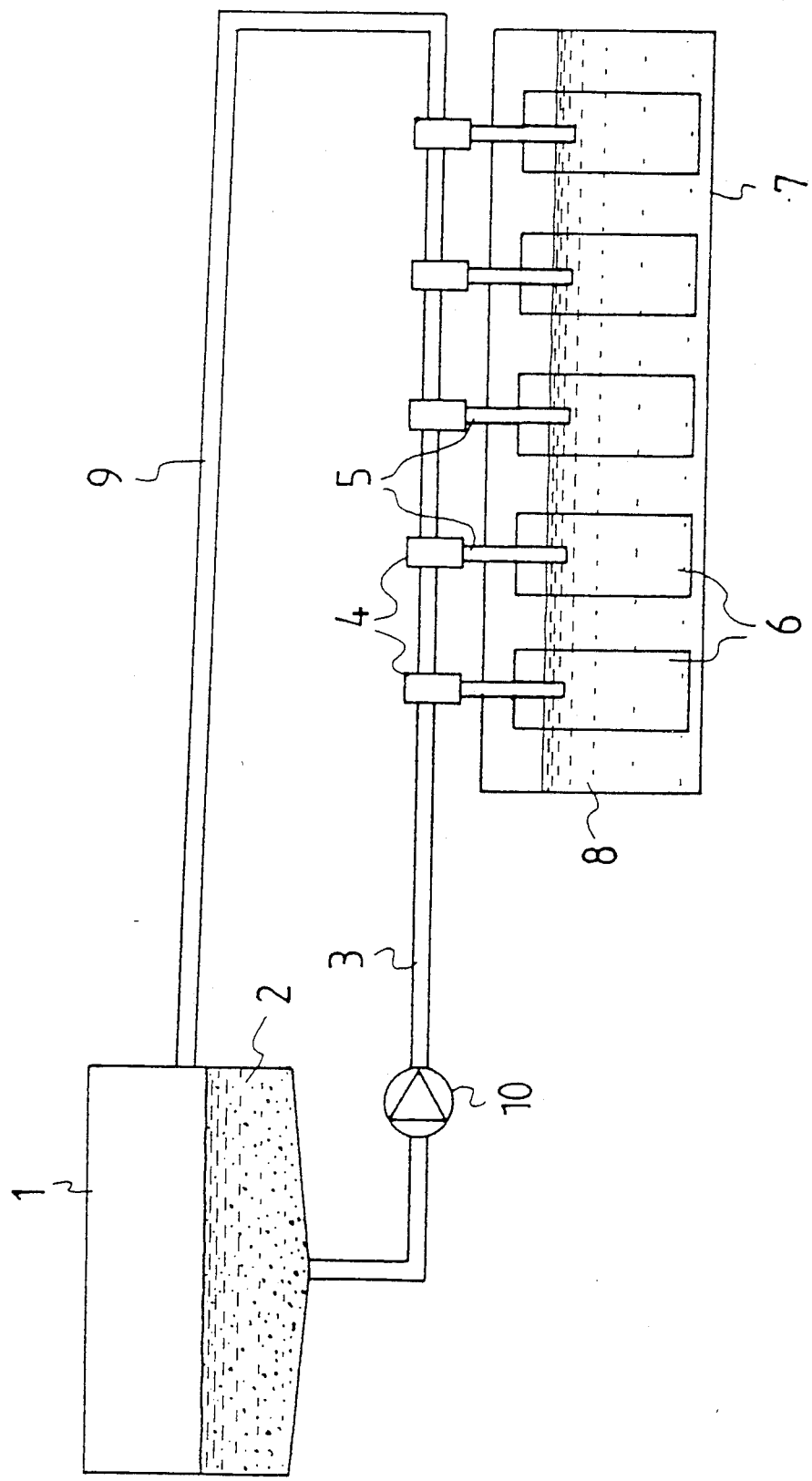

United States Patent [19]
Granberg et al.

[11] Patent Number: 4,994,287
[45] Date of Patent: Feb. 19, 1991

[54] METHOD AND APPARATUS FOR FILLING CURD INTO CHEESE MOULDS

[75] Inventors: Karl-Gustav Granberg, Paippinen; Lauri Kostiainen, Helsinki, both of Finland

[73] Assignee: Hackman-MKT Oy, Helsinki, Finland

[21] Appl. No.: 441,583

[22] Filed: Nov. 27, 1989

[30] Foreign Application Priority Data

Nov. 28, 1988 [FI] Finland .................. 885077

[51] Int. Cl.⁵ .................. A23P 1/00; G01N 33/00
[52] U.S. Cl. .................. 426/231; 99/458; 99/465; 425/84; 426/495; 426/512
[58] Field of Search .............. 426/231, 478, 495, 512; 99/456, 458, 459, 465; 425/84, 135

[56] References Cited

U.S. PATENT DOCUMENTS 3,541,686 11/1970 Koopmans .................. 426/512

FOREIGN PATENT DOCUMENTS 1034907 7/1958 Fed. Rep. of Germany .
1913698 10/1970 Fed. Rep. of Germany .
42767 6/1970 Finland .
405807 7/1966 Switzerland .

Primary Examiner—George Yeung
Attorney, Agent, or Firm—Armstrong, Nikaido, Marmelstein, Kubovcik & Murray

[57] ABSTRACT

The invention concerns a method and apparatus for filling curd into cheese moulds (6). During the cheese production process, milk is separated in a cheese vat (1) into curd and whey (2), both of which are routed to a piping manifold that distributes the curd for the run-off drainage of the whey (8) into cheese moulds (6) placed in a whey drainage vat (7). According to the invention, the manifold comprises a main line (3) exiting from the cheese vat, a plurality of side lines (5) branching from the main line and discharging into the multiple cheese moulds (6), and a return line (9) which forms a continuation of the main line and is routed back to the cheese vat, whereby the discharge of the curd in whey takes place as a continuous process via the main line and the side lines into the cheese moulds, while simultaneously the excess flow is returned at a set rate via the return line back to the pan. In its preferred form the apparatus comprises a plurality of moulds (6) connected to the main line (3) at its branching points (4), whereby the obtained semi-finished cheeses are small enough as not to require sectioning prior to pressing.

7 Claims, 2 Drawing Sheets

METHOD AND APPARATUS FOR FILLING CURD INTO CHEESE MOULDS

The present invention concerns a method for filling curd into cheese moulds, in which method the curd in whey is routed from the cheese vat into a piping manifold that distributes the curd for the separation of the whey into moulds placed in a whey drainage vat.

The cheese production process includes a coagulation phase, during which milk is separated into curd and whey. The mixture of curd in whey is discharged from the cheese vat via piping into cheese moulds, or hoops, placed in a whey separation vat. During the fill-in phase, whey associated with the curd prevents the curd from communicating with air, which might impair the quality of the formed mass of curd. In the moulds, the curd and whey are separated from each other with the help of walls and bottom in the moulds that are fabricated from perforated sheet so that whey can run off from the mould via the perforations.

According to a prior-art method, the curd in whey is discharged from the cheese vat into moulds placed in one or several whey separation vats via a piping manifold provided with a flow divider. The goal in the flow divider construction has been to obtain a homogeneous distribution of the curd in whey among the individual moulds. Such a flow divider is described in the FI patent disclosure publication 64260. This type of a method has the disadvantage, however, that the cheese obtained are substantially large in size. Consequently, they must be cut into blocks prior to final pressing in moulds, separately provided for this purpose. Herein, the sectioning of the curd obtained from the fill-in phase having the consistency of, at best, that of a prepressed mass of curd is cumbersome and may impair the internal structure of the curd. Moreover, the size reduction of cheese moulds might make it impossible to empty the cheese vat in a continuous and uninterrupted process anymore.

There is also known a method, in which the curd in whey is discharged from the cheese vat into a silo-shaped separation container, whose walls carry sieve zones for the separation of whey. The curd entering the top of the container settles downward and forms within the container into a column, whose lower end is continually sectioned into slices to be transferred into press moulds. The disadvantage of this method, too, is the need for the sectioning of a semifinished mass of curd.

The present invention aims to achieve a novel method for distributing curd in whey into cheese moulds, in which method the disadvantages of the aforementioned prior art methods are avoided. The invention is characterized by the division of the curd in whey from a main circulation within a piping manifold into side flows discharging into a plurality of cheese moulds, while the flow exiting the cheese vat is arranged greater in volume than the total flow discharged into the plurality of cheese moulds, whereby the excess flow is recirculated to the cheese vat.

An advantage of the present invention over conventional techniques is that the side flows branching from the main flow into the individual cheese moulds need not be adjusted mutually equal with a high accuracy. Instead, it is sufficient to be able to cut off a side flow as soon as the mould to be filled is full of curd. The continuity of the system operation is partly assured by the discharge of the curd in whey from the cheese vat in excess amounts, whereby the excess remaining after the discharge of the side flows is recirculated to the cheese vat, and partly by the possibility of emptying a filled mould or replacing it by an empty mould individually at the fill-up of each mould so that the mould starts being filled as soon as the associated fill-in flow is reopened. An essential characteristic herein is that the fill-in of the other moulds of the system with the curd in whey can be continued uninterrupted meanwhile any of the moulds is being emptied or replaced. Furthermore, the continuous flow in the piping and recirculation of flow to the cheese vat achieves the advantage of preventing the curd from clogging the piping.

The piping manifold carrying the curd in whey in accordance with the invention can have an extremely large number of moulds connected to it with such a small size that the cheese obtained need not be sectioned prior to the pressing phase. This approach avoids the cumbersome sectioning of semifinished mass of curd. The smallest practical cheese sizes produced in accordance with the method can be approx. 1 kg in weight.

According to the invention the side flows directed to the individual cheese moulds can be branched individually from the main flow at branching points placed sequentially at predetermined spacings. The moulds thus form a chain allowing a controlled method for the filling of the moulds and an easy cut-off of the side flows for the duration of the emptying or replacement of the mould as well as the subsequent restart of the side flows independently from each other.

A preferred embodiment of the invention provides the monitoring of mould fill-up with curd by means of sensor elements, which individually implement the closing of a side flow at the fill-up of the associated mould. The sensor element can comprise a sieve plate permeable to curd that is placed at the upper end of the mould and immersed below the whey top level, where it is being reciprocated vertically so that it first acts as a mixer promoting the settling of curd and then senses the fill-up of the mould by the contact with the accumulated curd thereby effecting the cut-off of the flow into the mould. The construction can be implemented by, for instance, connecting the sieve plate to a valve placed at the branching point of the side pipe entering the mould so that the valve monitors the capability of the sieve plate to reach its lowest position by cutting off the flow at the instant the position is not reached anymore, and at the contact of the sieve plate with the accumulated curd build-up, remains in the cut-off state at the motion seizure of the sieve plate and the connected valve.

Furthermore, the invention concerns an apparatus for the implementation of the aforedescribed method. Conventional elements in the apparatus comprise cheese moulds placed in a whey drainage vat as well as a piping manifold for the discharge of curd in whey from the cheese vat into the cheese moulds, wherein the piping manifold includes a main line exiting from the cheese vat as well as a plurality of side lines branching from the main line into the individual cheese moulds. The apparatus in accordance with the invention is characterized by having the manifold complemented with a recirculation line acting as a continuation of the main line allowing the excess remaining from the curd in whey entering the main line to be returned to the cheese vat.

Figure 2:
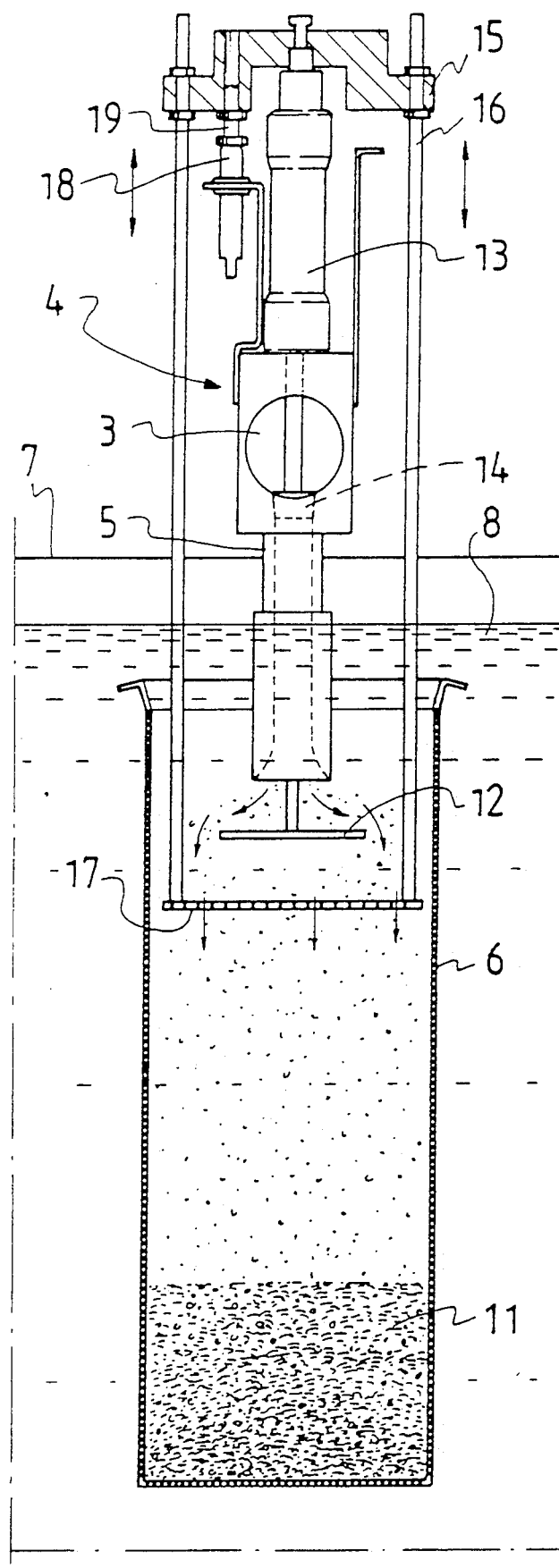

The invention is clarified in the following with the help of enclosed drawings in which:

FIG. 1 shows an apparatus in accordance with the invention having a chain of cheese moulds connected to a main line exiting from a cheese vat, and FIG. 2 shows in detail a single cheese mould and a construction used for connecting the mould via a side line to the main line.

According to FIG. 1 the apparatus comprises a cheese vat 1, in which milk is separated into curd and whey. The mixture 2 of curd in whey is then discharged from the cheese vat 1 to a main line 3 of the distribution manifold having a side line 5 diverging at five consecutive branching points 4 to discharge into a cheese mould 6. Thus, the apparatus incorporates five parallel cheese moulds 6, which are placed in a common whey drainage vat 7. The walls and bottoms of the moulds 6 are fabricated from a sieve plate permeable to fluids, and as illustrated in FIG. 1, during the operation of the apparatus they are for their most part immersed in the whey 8 drained from the curd. Next to the branching points 4, the main line is continued as a recirculation line 9 returning to the cheese vat 1.

The discharge of the mixture 2 of curd in whey is effected with the help of a pump 10 placed in the main line 3 that propels the flow into the moulds 6 along the main line and the side lines 5 branching from it, finally returning the excess via the recirculation line 9 to the cheese vat 1. As illustrated in FIG. 2, the curd 11 is settled in the cheese moulds 6 into cheese columns building up from the bottom of the mould, while the whey 8 is simultaneously drained from the mould through the perforated-sheet walls of the mould. During the settling phase, the curd in whey is fed to the upper ends of the moulds 6 placed in the drainage vat 7 making it possible for the curd to settle gravitationally, while a construction based on pumping does not necessarily presume within the scope of the invention the placement of the cheese vat 1 above the level of the drainage vat 7.

Illustrated in detail in FIG. 2 are the side lines 5 discharging into the cheese moulds 6 as well as their connection to the main line 3 at the branching points 4. The side line 5 is appropriately continued below the level of the whey 8 in the drainage vat 7, while its end is provided with an immobile solid distributing plate 12. Above the main line 3 at the branching point 4 is placed a hydraulic cylinder 13, which reciprocates a structure comprising a valve plug 14 and a top yoke 15 with attached support bars 16, which support a horizontally aligned sieve plate 17 placed below the distributing plate 12 within the cheese mould 6. In FIG. 2 the structure is illustrated in its lowest position, wherein the valve plug 14 closes the end of the side line 5. Further, the hydraulic cylinder 13 has a parallelly mounted immobile sensor 18, which contacts an adjustable screw 19 attached to the yoke 15 when the movable structure is in its lowest position in accordance with FIG. 2.

During the operation of the apparatus, the abovedescribed structure comprising the valve plug 14 and the sieve plate 17 supported by the support bars 16 reciprocates vertically, actuated by the hydraulic cylinder 13. When the end of the side line 5 is opened, the mixture of curd in whey is released to flow via the side line into the mould 6, wherein the curd is gravitationally settled flowing around the distributing plate 12 and penetrating the sieve plate 17. The purpose of the reciprocating motion of the sieve plate 17 is to homogenize both the settling of curd in whey 8 and its accumulation on the bottom of the mould. In addition, the sieve plate 17 acts as a sensor, which with the fill-up of the mould 6 actuates the cut-off of the flow of the curd in whey into the mould. This action is based on a sequence in which a cheese column 11 accumulated in the mould grows to a sufficient height to prevent the sieve plate from reaching its lowest position, whereby the contact between the screw 19 at the yoke 15 and the sensor 18 cannot be maintained anymore. In this configuration, the sensor 18 has been arranged to cut off the operation of the hydraulic cylinder 13, thus stopping the reciprocating motion and allowing the valve plug 14 to remain in a position closing the side line 5. At this stage, the filled cheese mould 6 can be emptied or replaced by another, empty mould without causing disturbance to the continued filling of the other moulds of the apparatus. As soon as the mould has been emptied or replaced, the discharge of the curd in whey into the mould can be continued by restarting the operation of the cylinder 13.

The discharge of the curd in whey is continued in the method described above until the cheese vat 1 is empty. During this time the individual cheese moulds 6 can be emptied or replaced several times, and the fill-up times of the moulds are advantageously interlaced so that most of the moulds are being filled continually.

For those versed in the art, it is evident that the different implementations of the invention are not exhausted by the embodiments described above, but instead, can vary within the scope of the claims. The construction of the apparatus can be different from that illustrated in FIG. 2 by having the motions of the valve plug 14 and the sieve plate 17 being arranged independent from each other. The number of cheese moulds 6 incorporated in the apparatus can also vary within wide limits with a practical lower limit of 3 moulds, while an advantageous situation can be attained by aiming at an apparatus incorporating several tens of moulds having such a small size to dispose of the need for sectioning the semifinished cheese produced in the moulds during the progress of the process. The cheese weights can vary within an approximate range of 1 ... 80 kg, while the preferred range is approx. 1 ... 5 kg.

What is claimed is:

1. A method for filling curd (1) into cheese moulds (6), in which method the curd in whey (2) is routed from a cheese vat (1) into a piping manifold (3, 5, 9), which divides the curd into moulds placed in a whey drainage vat (7) for the separation of whey (8), comprising dividing the curd in whey (2) in the piping network from a main flow exiting from the cheese vat (1) into side flows; discharging said side flows into the individual cheese moulds (6); causing the flow exiting the cheese vat to be greater in volume than the total of side flows entering the moulds; and recirculating the excess curd in whey back to the cheese vat.

2. A method as claimed in claim 1, wherein the side flow entering the cheese moulds (6) are diverged from the main flow at branching points (4) individually situated at predetermined spacings.

3. A method as claimed in claim 1 or 2, wherein the fill-up of the cheese moulds (6) with the curd (11) is monitored by means of sensor elements (17) which, at the fill-up of any mould, cut off the flow into that particular mould.

4. A method as claimed in claim 3, wherein the sensor elements used comprise a sieve plate (17) permeable to curd that is placed at the upper end of the mould (6) and immersed below the top level of whey (8), where it is being reciprocated vertically so that it first acts as a mixer promoting the settling of curd and secondly effects the cut-off of the flow into the mould by sensing the accumulated curd build-up at the fill-up stage of the mould through a contact with the accumulated curd layer (11).

5. An apparatus for filling curd into cheese moulds comprising cheese moulds (6) placed in a whey drainage vat (7) and a manifold for discharging curd in whey (2) from the cheese vat (1) into the cheese moulds; the manifold incorporating a main line (3) exiting from the cheese vat and a plurality of side lines (5) diverging from the main line and discharging into the individual cheese moulds, wherein a piping manifold is additionally complemented with a recirculation line (9) acting as a continuation of the main line (3), via which recirculation line the excess remaining from the curd in whey entering the main line can be returned to the cheese vat.

6. An apparatus as claimed in claim 5, wherein the side lines (5) diverge from the main line (3) individually at branching points (4) situated at predetermined spacings.

7. An apparatus as claimed in claim 5 including a sensor element formed by a sieve plate (17) permeable to curd that is placed at the upper end of the mould (6) and is arranged to be reciprocatingly movable vertically so as to make possible, prior to the fill-up of the mould, its use as a mixer promoting the settling of curd while the mould is being immersed in the whey (8) filling the whey drainage vat (7).

* * * * *